United States Patent
Trost et al.

(10) Patent No.: US 10,902,114 B1
(45) Date of Patent: Jan. 26, 2021

(54) AUTOMATED CYBERSECURITY THREAT DETECTION WITH AGGREGATION AND ANALYSIS

(71) Applicant: ThreatQuotient, Inc., Reston, VA (US)

(72) Inventors: Ryan Trost, Vienna, VA (US); Leon Ward, Reading (GB)

(73) Assignee: THREATQUOTIENT, INC., Reston, VA (US)

(*) Notice: Subject to any disclaimer, the term of this patent is extended or adjusted under 35 U.S.C. 154(b) by 268 days.

(21) Appl. No.: 16/208,531

(22) Filed: Dec. 3, 2018

Related U.S. Application Data

(63) Continuation-in-part of application No. 15/261,867, filed on Sep. 9, 2016, now abandoned.

(60) Provisional application No. 62/631,695, filed on Feb. 17, 2018, provisional application No. 62/594,014, filed on Dec. 3, 2017, provisional application No. 62/215,777, filed on Sep. 9, 2015.

(51) Int. Cl.
| | |
|---|---|
| G06F 21/55 | (2013.01) |
| G06F 16/26 | (2019.01) |
| G06F 16/22 | (2019.01) |
| G06F 16/28 | (2019.01) |

(52) U.S. Cl.
CPC ............ *G06F 21/552* (2013.01); *G06F 16/22* (2019.01); *G06F 16/26* (2019.01); *G06F 16/288* (2019.01); *G06F 2221/034* (2013.01)

(58) Field of Classification Search
CPC ...... G06F 21/55; G06F 21/552; G06F 21/554; G06F 21/56; G06F 21/562; G06F 21/564; G06F 16/22; G06F 16/26; G06F 16/288; H04L 63/14; H04L 63/1416; H04L 63/1425; H04L 63/20
See application file for complete search history.

(56) References Cited

U.S. PATENT DOCUMENTS

| | | | | |
|---|---|---|---|---|
| 8,813,228 | B2* | 8/2014 | Magee | H04L 63/20 726/24 |
| 2016/0065599 | A1* | 3/2016 | Hovor | H04L 63/1416 726/23 |
| 2016/0149943 | A1* | 5/2016 | Kaloroumakis | H04L 63/1416 726/23 |
| 2016/0269434 | A1* | 9/2016 | DiValentin | H04L 63/1408 |
| 2017/0006054 | A1* | 1/2017 | Stiansen | H04L 63/1425 |
| 2017/0116416 | A1* | 4/2017 | Pearcy | G06F 21/577 |
| 2018/0255080 | A1* | 9/2018 | Paine | G06F 21/55 |
| 2018/0324197 | A1* | 11/2018 | Zettel, II | H04L 43/062 |
| 2019/0068616 | A1* | 2/2019 | Woods | H04L 63/145 |
| 2020/0202008 | A1* | 6/2020 | Pfleger de Aguiar | G06F 11/3041 |
| 2020/0329058 | A1* | 10/2020 | Paine | G06F 21/552 |

\* cited by examiner

*Primary Examiner* — Khang Do
(74) *Attorney, Agent, or Firm* — Slayden Grubert Beard PLLC

(57) ABSTRACT

The systems and methods described herein generally relate to techniques for automated detection, aggregation, and integration of cybersecurity threats. The system ingests multiple data feeds which can be in one or numerous different formats. The system evaluates information based on defined scores to display to users threats and risks associated with them. The system also calculates decay rates for expiration of threats and indicators through various methods.

13 Claims, 24 Drawing Sheets

| Source | | IOC Type | |
|---|---|---|---|
| Intel Provider 1 | 10 | IP Address | 15 |
| Intel Provider 2 | 3 | FQDN | 20 |
| Intel Provider 3 | 30 | MD5 | 130 |
| Intel Provider 4 | 65 | URL | 5 |

Intel Provider 1 IP Blacklist (10) + IP address (15) = 25 day Active period, and as such set to automatically be Expired 25 days from creation.
VX Vault URL (30) + URL (5) = 35 days until Expired

FIG. 2

Overarching Parameter Weights:

| Enable/Disable | Parameters | Weight |
|---|---|---|
| E | Source | 30% |
| E | IOC Type | 15% |
| E | Occurrences | 35% |
| E | Adversary Association | 10% |
| E | IOC Role/Kill Chain | 10% |
| Total | | 100% |

FIG. 5A

Sources:

| Sources | Rank(1-10) | Aging |
|---|---|---|
| Intel Provider 1 | 10 | C |
| Intel Provider 2 | 10 | C |
| Intel Provider 3 | 8 | A |
| Intel Provider 4 | 6 | D |
| Intel Provider 5 | 4 | D |
| Intel Provider 6 | 3 | D |
| Intel Provider 7 | 4 | B |
| Intel Provider 8 | 4 | B |

FIG. 5B

Sources:

| IOC Type | Rank(1-10) | Aging |
|---|---|---|
| FQDN | 10 | A |
| EmailAddress | 10 | B |
| Email Attachment | 10 | B |
| Email Subject | 6 | D |
| IP Address | 4 | D |
| URL | 3 | D |
| MD5 | 4 | C |
| SHA-1 | 4 | C |

FIG. 5C

Occurrences:

| Occurrences | Rank(1-10) | Aging |
|---|---|---|
| Events | | |
| SIEM | 10 | B |
| Sensor Grid | 10 | B |
| Incidents | | |
| Ticket System | 4 | D |
| Malware Sandbox | 3 | D |
| Frequencies | | |
| xx - xx | 8 | A |
| yy - yy | 5 | B |
| zz - zz | 2 | D |

FIG. 5D

|  | Context | Score (0-10) |
|---|---|---|
| Intelligence Provider 1 | DomainType | 8 |
|  | DomainType | 5 |
|  | DomainType | 9 |
|  | DomainType | 10 |
|  | DomainType | 7 |
|  | <cut> |  |
|  | IPAddressType | 10 |
|  | IPAddressType | 7 |
|  | IPAddressType | 8 |
|  | IPAddressType | 2 |
|  | <cut> |  |
|  | Status | 0 |
|  | Status | 6 |
|  | ThreatType | 4 |
|  | ThreatType | 6 |
|  | ThreatType | 3 |
|  | ThreatType | 0 |
|  | ThreatType | 0 |
|  | ThreatType | 2 |
|  | ThreatType | 0 |
| Intelligence Provider 2 | NetworkIdentifier | 8 |
|  | NetworkIdentifier | 4 |
|  | NetworkIdentifier | 3 |
|  | NetworkIdentifier | 2 |
|  | NetworkIdentifier | 6 |
| Int. Prov. 3 | Comment | 5 |
| Intelligence Provider 4 | SpyEye | 3 |
|  | Zeus | 5 |
|  | Tor | 7 |
|  | Palevo | 3 |
|  | Feodo | 6 |

FIG. 6A

| Third-Party Score | | Score (0-10) |
|---|---|---|
| Intelligence Provider 1 | Confidence/High | 9 |
| | Confidence/Medium | 6 |
| | Confidence/Low | 3 |
| Intelligence Provider 2 | Confidence/High | 9 |
| | Confidence/Medium | 6 |
| | Confidence/Low | 3 |
| | Impact/Critical | 10 |
| | Impact/High | 8 |
| | Impact/Medium | 5 |
| | Impact/Low | 2 |
| Intelligence Provider 3 | Confidence/High | 10 |
| | Confidence/Medium | 6 |
| | Confidence/Low | 3 |
| | Severity/High | 10 |
| | Severity/Medium | 5 |
| | Severity/Low | 1 |

Example of use of third-party indicators and weights

Adversary Parameters with Associated Weight:

| Phase I | Weight | Phase II | Weight | Phase III | Weight |
|---|---|---|---|---|---|
| Adversary Category | 30% | Adversary Category | 5% | Adversary Category | 5% |
| Attack Vector | 25% | Attack Vector | 10% | Attack Vector | 10% |
| Frequency | 10% | Frequency | 15% | Frequency | 10% |
| IOC Reuse/Lifecycle | 15% | IOC Reuse/Lifecycle | 15% | IOC Reuse/Lifecycle | 10% |
| Victimology/Target Development | 20% | Victimology/Target Development | 5% | Victimology/Target Development | 5% |
| TOTAL | 100% | Attack Events | 10% | Attack Events | 10% |
| Xxxxxxxxxxxxxxxxx xxxxxx | xxxxxx xx | Success Rate | 0%* | Success Rate | 0%* |
| Xxxxxxxxxxxxxxxxx xxxxxx | xxxxxx xx | Malware Evaluation | 15% | Malware Evaluation | 10% |
| Xxxxxxxxxxxxxxxxx xxxxxx | xxxxxx xx | C2 Obfuscation | 10% | C2 Obfuscation | 5% |
| Xxxxxxxxxxxxxxxxx xxxxxx | xxxxxx xx | Lateral Movement | 0%* | Lateral Movement | 5% |
| Xxxxxxxxxxxxxxxxx xxxxxx | xxxxxx xx | Defense Posture/Technology | 15% | Defense Posture/Technology | 10% |
| Xxxxxxxxxxxxxxxxx xxxxxx | xxxxxx xx | TOTAL | 100% | Packer Score | 5% |
| xxxxxxxxxxxxxxxxxx xxxxx | xxxxxx xx | Xxxxxxxxxxxxxxxxxx xxxxx | xxxxxx xx | Malware Family | 0%* |
| xxxxxxxxxxxxxxxxxx xxxxx | xxxxxx xx | Xxxxxxxxxxxxxxxxxx xxxxx | xxxxxx xx | Anti-Forensic Technique | 15% |
| xxxxxxxxxxxxxxxxxx xxxxxx | xxxxxx xx | xxxxxxxxxxxxxxxxxx xxxxxx | xxxxxx xx | TOTAL | 100% |

* demonstrates how a customer will disable a parameter from being included

| Adversary Category | Score (1-10) |
|---|---|
| APT/Foreign Intelligence | 10 |
| Crimeware | 8 |
| Hacktivist | 3 |
| Professional Hacker/Mercenary | 8 |
| Other | 5 |

<u>Adversary Category [Phase I, II, III]</u>: The adversary category allows customers to "bucketize" various groups and apply a risk score to the category posing the greatest risk to the company.

FIG. 8A

| Attack Vector | Score (1-10) |
|---|---|
| Spearphish | 10 |
| Watering Hole Attack | 8 |
| DoS/DDoS | 3 |
| SQL Injection | 8 |
| Drive by Malware | 5 |
| Malvertising | 4 |
| Other | 5 |

<u>Attack Vector [Phase I]</u>: The attack vector provides a high-level assessment of the preferred attack path(s) of an adversary and a self-assessed ability to defend against it by the organization.

FIG. 8B

| Phase I: | | Phase II, III: | |
|---|---|---|---|
| IOC Reuse/Lifecycle | YES/NO | IOC Reuse/Lifecycle | YES/NO |
| Network-based IOCs | Y/N | Network-based IOCs | |
| Host-based IOCs | Y/N | >90% change | Y/N |
| xxxxxxxxxxxxxxxxxxxxxxxx | xxxxxxxxx | 60-90% change | Y/N |
| xxxxxxxxxxxxxxxxxxxxxxxx | xxxxxxxxx | 20-59% change | Y/N |
| xxxxxxxxxxxxxxxxxxxxxxxx | xxxxxxxxx | <20% | Y/N |
| xxxxxxxxxxxxxxxxxxxxxxxx | xxxxxxxxx | Host-based IOCs | |
| xxxxxxxxxxxxxxxxxxxxxxxx | xxxxxxxxx | >90% change | Y/N |
| xxxxxxxxxxxxxxxxxxxxxxxx | xxxxxxxxx | 60-90% change | Y/N |
| xxxxxxxxxxxxxxxxxxxxxxxx | xxxxxxxxx | 20-59% change | Y/N |
| xxxxxxxxxxxxxxxxxxxxxxxx | xxxxxxxxx | <20% | Y/N |

IOC Reuse/Lifecycle [Phase I, II, III]: The ability to change IOC infrastructure by an adversary speaks to their funding and organization as a whole. Network-and host-based indicators should be treated differently because each requires a level of effort to maintain, use, and change when necessary.

FIG. 8C

| Success Rate | YES/NO |
|---|---|
| Frequent Success (>85% infection rate) | Y/N |
| Occasional Success (40% – 84% infection rate) | Y/N |
| Seldom Success (1%- 39% infection rate) | Y/N |
| Never | Y/N |

Success Rate [Phase II, III]: The rate of success of an adversary directly speaks to their sophistication and determination.

FIG. 8D

| Phase I: | | Phase II, III: | |
|---|---|---|---|
| Frequency of Attacks | Score (1-10) | Frequency of Attacks | Score (1-10) |
| Daily | 10 | Daily | 10 |
| Weekly | 8 | Weekly | 8 |
| Monthly | 3 | Monthly | 3 |
| Quarterly | 8 | Quarterly | 8 |
| Ad-hoc | 5 | Ad-hoc | 5 |
| xxxxxxxxxxxxxxxxxxxx | xxxxxx | "Follow the Sun" | 8 |
| xxxxxxxxxxxxxxxxxxxx | xxxxxx | Shortly after patch release | 9 |
| xxxxxxxxxxxxxxxxxxxx | xxxxxx | Shortly after company announcement | 10 |

Frequency of Attacks [Phase I, II, III]: The frequency of attack of an adversary reflects the aggression or urgency to infiltrate the environment.

FIG. 8E

| Attack Events | Score (1-10) |
|---|---|
| Spearphish | 1-10 |
| Watering-Hole Attack | 1-10 |
| DoS/DDoS | 1-10 |
| SQL Injection | 1-10 |
| Drive-by Malware | 1-10 |
| Malvertising | 1-10 |
| Other | 1-10 |

Note: Each attack itself is rated between 1-10; not the attack vector itself.

FIG. 8F

| | Adversary Category | Success Rate | Frequency | IOC Reuse/Lifecycle | Attack Events | Victimology | Malware | C2 Usage | Lateral Movement | Defense Technology | Total |
|---|---|---|---|---|---|---|---|---|---|---|---|
| Mr. Silver | 4 | 3 | 3 | 4 | 2 | 1 | 2 | 3 | 4 | 4 | 30 |
| Mr. Chartreuse | 3 | 4 | 5 | 2 | 1 | 4 | 3 | 3 | 4 | 4 | 33 |
| Mr. Black | 3 | 2 | 3 | 4 | 2 | 5 | 2 | 3 | 4 | 4 | 32 |
| Mr. Blue | 3 | 1 | 4 | 4 | 5 | 3 | 4 | 2 | 4 | 4 | 34 |
| Mr. White | 4 | 2 | 2 | 3 | 4 | 2 | 2 | 4 | 3 | 2 | 28 |
| Mr. Red | 4 | 3 | 3 | 3 | 3 | 3 | 3 | 3 | 4 | 1 | 30 |
| Mr. Orange | 4 | 5 | 2 | 3 | 3 | 4 | 2 | 4 | 4 | 1 | 32 |
| Mr. Yellow | 3 | 3 | 3 | 1 | 2 | 3 | 3 | 3 | 4 | 1 | 26 |
| Mr. Pink | 3 | 2 | 4 | 1 | 3 | 4 | 3 | 3 | 4 | 1 | 28 |
| Mr. Gold | 4 | 1 | 5 | 4 | 2 | 2 | 3 | 3 | 3 | 2 | 29 |
| Mr. Teal | 3 | 2 | 5 | 5 | 2 | 1 | 2 | 3 | 4 | 1 | 28 |
| Mr. Sunglow | 3 | 5 | 4 | 4 | 3 | 2 | 1 | 3 | 3 | 1 | 29 |
| Mr. Green | 3 | 5 | 4 | 3 | 5 | 5 | 1 | 3 | 1 | 1 | 31 |

Darryl Dube

Expand | Remove from Investigation

TYPE
Identity

SUBTYPE
—

STATUS
—

RELATIONSHIPS
3

TASKS
0

COMMENTS
0

SOURCES (1)
HR

FIRST SEEN
06/13/2018

CREATED
06/13/2018

LAST MODIFIED
06/13/2018

▼ DESCRIPTION
Financial controller

▶ COMMENTS (0)

RELATIONSHIPS

▼ ⌀ TAGS (1)
Name ⇵
Finance

▼ EVENTS (1)
Title ⇵
First draft of legal documents

▼ INDICATORS (1)
Value ⇵                Score ⇵
darryl.dube@thefuturephone.c...    4

Fig. 19

AUTOMATED CYBERSECURITY THREAT DETECTION WITH AGGREGATION AND ANALYSIS

CROSS-REFERENCE TO RELATED APPLICATIONS

This application is a continuation-in-part of application Ser. No. 15/261,867, filed Sep. 9, 2016, which claims the benefit of U.S. Provisional Application No. 62/215,777, filed Sep. 9, 2015, the contents of each of which are herein incorporated by reference in their entireties. This application also claims the benefit of U.S. Provisional Application No. 62/594,014, filed Dec. 3, 2017, and U.S. Provisional Application No. 62/631,695, filed Feb. 17, 2018, the contents of each of which are herein incorporated by reference in their entireties.

FIELD OF THE INVENTION

The systems and methods described herein generally relate to techniques for automated detection, aggregation, and integration of cybersecurity threats.

BACKGROUND OF THE INVENTION

Current cybersecurity threat indicator tracking and indication systems require that operators archive indicators in ad-hoc spreadsheets which often leads to version control issues, inability to push/pull to sensors, and limited intelligence pivoting, among other shortcomings. Other solutions include internally developed solutions or a leveraged "shared tool." These solutions often lead to a struggle to find internal expertise necessary to properly maintain, customize and manually update the tool to optimize the time and capabilities of an analyst. These internally developed solutions generally lack cross-platform and multi-format capabilities.

Additionally, in known systems, differences in data formats, construction and data content of external threat feeds do not allow for automated compilation into a single format. Analyst input and actions are necessary during ingest and/or during compilation or translation into a single format for the intelligence and information to be useful. As a result, active information security threats cannot be mitigated efficiently, or at all, in some cases.

BRIEF DESCRIPTION OF THE DRAWINGS

FIG. 2 illustrates an example of source and indicator of compromise (IOC) types with scores.

FIGS. 5A-5D illustrate example aging parameter weight tables.

FIGS. 6A and 6B illustrate examples of indicator context scores.

FIG. 7 illustrates example adversary parameter weight tables.

FIGS. 8A-8F illustrate examples of adversary score tables.

FIG. 9 illustrates an example visual adversary scorecard display.

FIG. 14 illustrates an example detail panel for an identity data container object in a threat investigation.

FIG. 19 illustrates an example detail panel for an event data container object in a threat investigation.

DETAILED DESCRIPTION

In the following description of embodiments, reference is made to the accompanying drawings, which form a part hereof, and in which it is shown by way of illustration specific embodiments of claimed subject matter. It is to be understood that other embodiments may be used and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The procedures described herein could also be executed in different orders. Additionally, various computations that are described below need not be performed in the order disclosed and other embodiments using alternative orderings of the computations could be readily implemented. In addition to being reordered, the computations could also be decomposed into sub-computations with the same results.

Described herein are systems and methods that relate to automated integration of cybersecurity threat indicators, trends, tactics, techniques and procedures (TTPs) to more efficiently harness actionable intelligence in response to cyber threats and actors.

Figure 1:
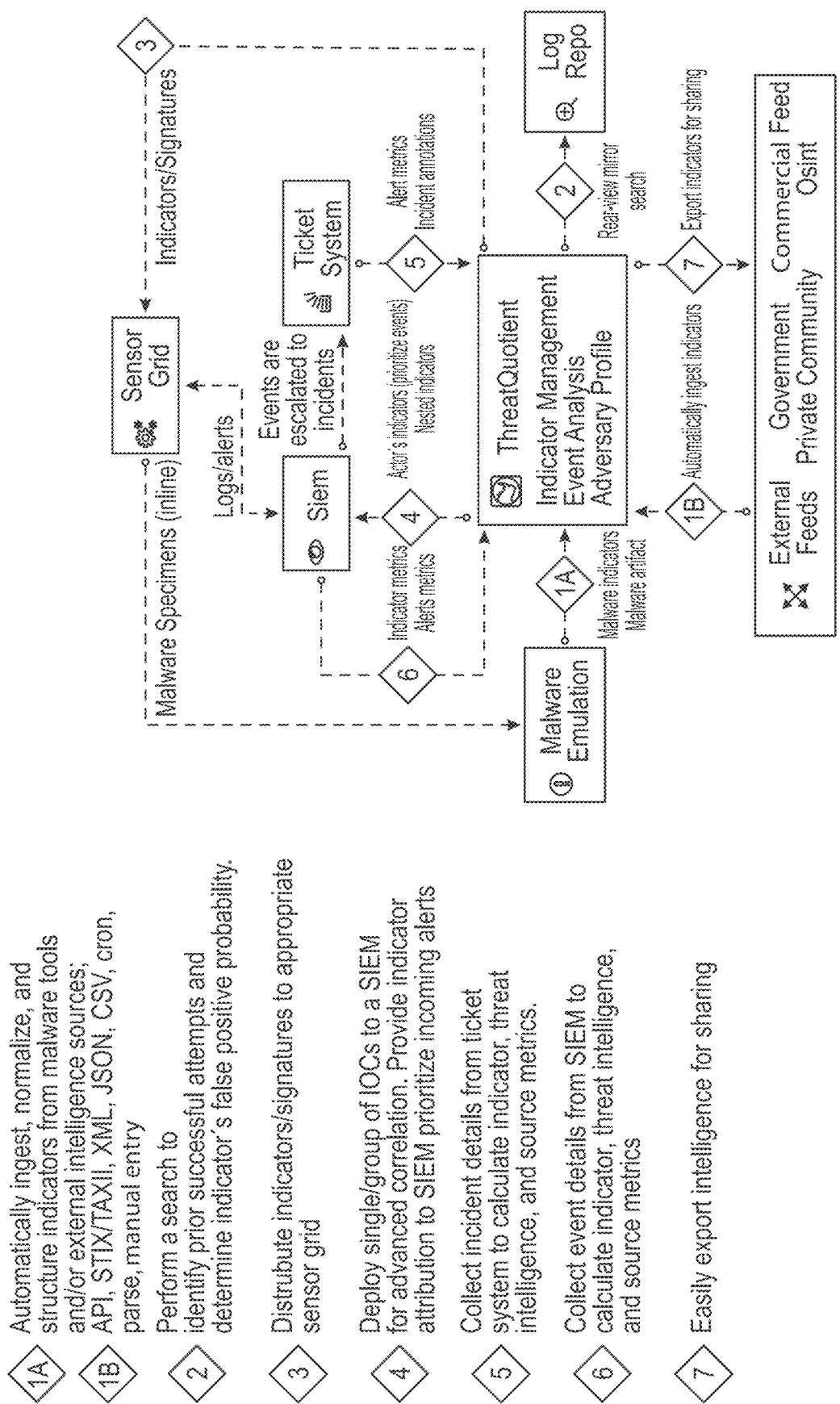
FIG. 1 illustrates an example system information flow diagram.
Figure 3:
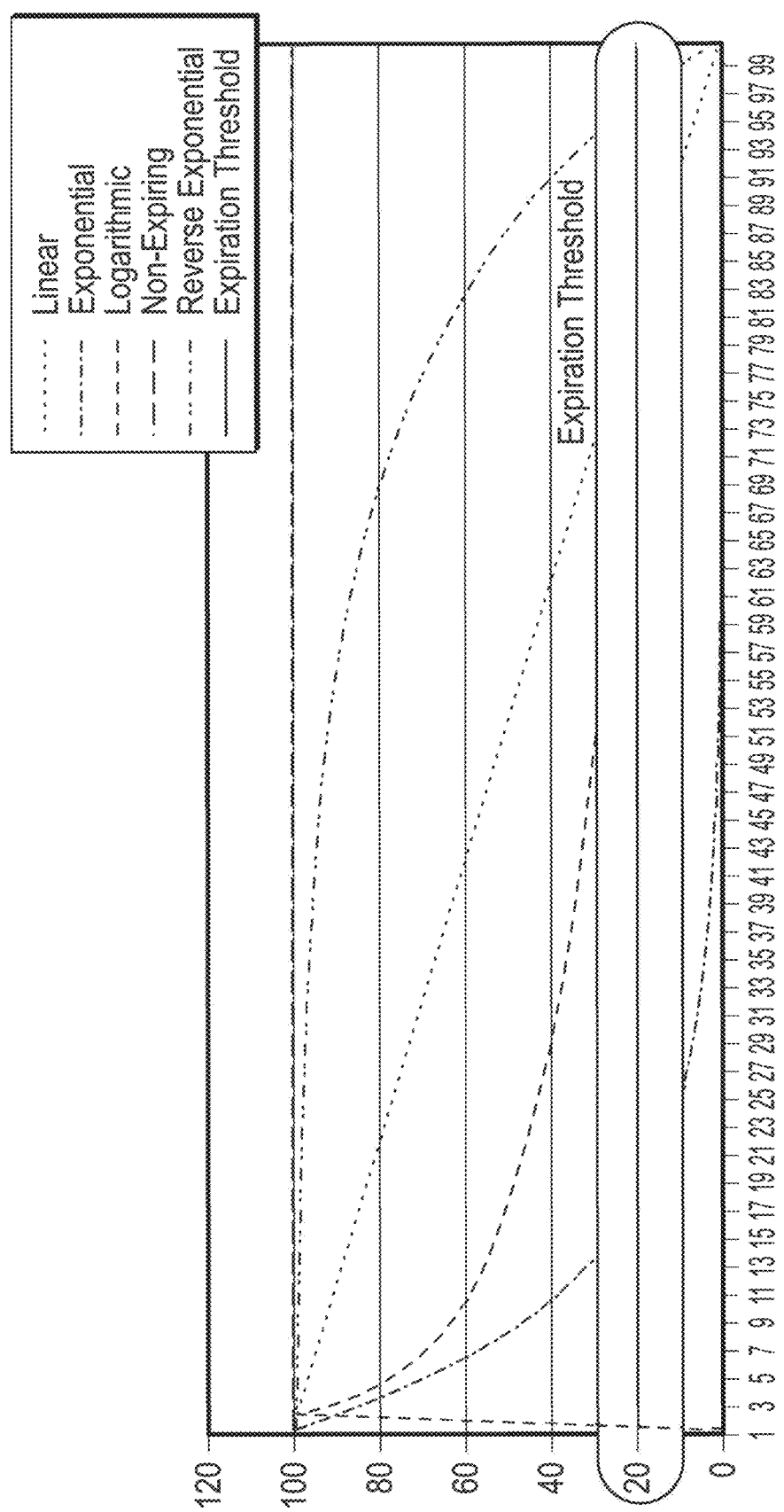
FIG. 3 illustrates an example expiration methodologies comparison graph.

The invention is comprised of various modules. These modules can be separate physical entities or can be combined into one physical entity or be geographically disparately located. FIG. 1 illustrates an example embodiment of the modules. The basic modules that comprise the system are Indicator Management, Event Analysis, Adversary Profile, Log Repository, Malware Emulation, Sensor Grid, Security Information Event Management, and Ticket System modules. The Core Module can include any or all of the Indicator Management, Event Analysis and Adversary Profile modules. These are connected to external components and feeds for monitoring components, networks or systems and ingesting and exporting indicators and data.

The invention can be configured to automatically ingest, standardize, track, detect, analyze, search, and distribute indicators to existing tools to capitalize on information sharing, threat intelligence feeds, and/or malware dissection. The invention's analytical capabilities can automatically parse email headers, content and attachments to extract indicators for processing. This provides data necessary for intelligence analysts to overlay chronological attributed or non-attributed datapoints and pivot off events in order to discover trends or suspicious patterns. The actor profiling module enables tracking of campaign attribution to an indicator or set of indicators or events, thereby providing attack targeting and mission objectives of the threat actor(s). Through the analysis and tagging of campaign attribution to an event (e.g., spearphish, SQL injection, wateringhole attack), computer network defense (CND) teams can deconstruct patterns and logic of adversaries over several attack progressions and build a threat profile to determine which defensive strategies will provide effective and successful blocking or detection rates. The analytical capabilities of the invention improve efficiencies and significantly increase productivity by measuring and evaluating critical security metrics through automated processes.

The system uses Connectors for automatically importing or exporting indicators and related meta-data into the system. These Connectors allow the system to ingest substantially different formats, fields and data types and convert them into a single usable format for analysis and dissemination. Ingested data can include, for example, data from MS-Word documents, PDFs, MD5 files, and/or code fragments. The system is able to ingest non-standardized data formats and convert them to a single standard. Example formats could include http://www.sitename.com, sitename.com, or "h t t p colon, slash, slash, sitename dot com," and other permutations, such as additional spaces between words, or the use of symbols or words for standard characters, such as spelling out "tilde" instead of using the "~" character. In other input feeds, the document format may require optical character recognition to convert the document into machine-readable format, such as from a PDF or JPG file. The system is able to ingest any or all of these formats and categorize them properly, such that each reference to sitename is understood to be the same Source.

Another feature is the integration of the system such that it can convert the output to a dashboard that an analyst is using and lower the number of screens that an analyst monitors in order to consolidate data. The system can also function as its own stand-alone, with a dashboard and display feeds.

The system functions to automatically ingest, or, at the option of an analyst, can be set to manually ingest, external feeds of information to include from repositories containing indicators, warnings, data and intelligence from open sources (OSINT), government sources, and private community and commercial sources. A Core Module has been designed to work with numerous disparate input types and is able to automatically ingest these different types and reformat them into a common format automatically.

Core Module

As illustrated in FIG. 1, the Core Module contains the Indicator Management, Event Analysis and Adversary Profiling modules. The indicator management module analyzes the external feeds in conjunction with data from the Sensor Grid, Security Information Event Management (SIEM), Malware Emulation, Ticket System module and log repository modules. The Indicator Management module develops current indicators of compromise (IOCs) based on user-defined levels and the information it automatically obtains and ingests. The collective information input will be used to generate indicator scoring and automatic expiration of indicators by the Indicator Management module. These indicators, with their expiration parameters and signatures, are provided to the Sensor Grid, which monitors network(s) and system(s) to be protected. These indicators and data can be immediately exported to external sources as well to the log repository.

Sensor Grid and Security Information Event Management Modules

The Sensor Grid module can be a module designed to control sensors and monitors or it can simply be sensors that are connected to the system for monitoring components. In either embodiment, the Sensor Grid receives indicators and signatures from the core module and communicates with an STEM module. The communication between the STEM module and the Sensor Grid is two-way, the STEM receives data and logs and alerts and sends alerts and updated parameters to the Sensor Grid as the STEM compiles and analyzes data received from the Sensor Grid as well as input from the Core Module.

The Sensor Grid monitors components. Components can include computers, networks, network connections, data in transit and data at rest and any communications that occur. The Sensor Grid can also monitor modules of the system in some embodiments. All actions taken and data monitored by the Sensor Grid can be recorded in logs, these logs and actions can then be sent to the SIEM Module. They can be recorded and sent in batches to the STEM or be sent in a live stream to the STEM Module. They can also be recorded directly in the log repository as well as being sent directly to the STEM Module. The system can be set to forward the logs or to switch to live feed depending on what the Sensor Grid detects or at the option of a user.

When the Sensor Grid detects possible malware, be it matching indicators, signatures, detecting a virus, malicious actions, malicious code, unauthorized access, or any other parameter the Sensor Grid has been programmed to recognize, preprogrammed actions can be taken by the Sensor Grid. These actions can include forwarding an alert to the SIEM Module. The STEM Module can conduct preliminary analysis of the event and compile indicator metrics, alert metrics and source metrics. These metrics can be forwarded to the Core Module for further analysis. These metrics are the input, in addition to the input from the Malware Emulation Module and external feeds and Log Repository, the Indicator Management Module, Event Analysis Module and Adversary Profiling Modules. If the event meets certain metrics as predefined, the event is escalated to an incident and forwarded to the Ticket System Module for notification to analysts.

The STEM Module also can notify the Sensor Grid to forward the malware specimen, in its inline form, to the Malware Emulation Module. The Sensor Grid can also be programmed to automatically send certain kinds of detected malware to the Malware Emulation Module immediately, or the malware and certain other data regarding the actions of the malware, such as the files the malware was detected in or detected accessing or attempting to access. Each time the Sensor Grid forwards directly to the Malware Emulation Module, notification can be provided to the STEM Module.

Malware Emulation Module

The Malware Emulation Module can be configured to assess and extract malware indicators and artifacts such that they can be safely utilized and analyzed. These indicators and artifacts will be input into the Core Module.

When an event is escalated to an incident, the Ticket System Module notifies an analyst of the system. This can be achieved through onscreen indicators, sound alerts or other methods or can be added to a stack or queue of events for the analyst to further study. Additionally, the Ticket System can be programmed to calculate indicators, source metrics and collect threat intelligence. Source metrics can include origination IP or other information identifying where the incident originated from. Other threat indicators or source metrics can include signatures or indicators that are present or match certain criteria, or that are detected at certain times or time intervals. It can include files, folders, ports, components, networks, repositories, systems or networks that were attempted to be, or were, accessed or modified or monitored. This information can be identical or similar to that extracted by the STEM Module. It can be forwarded to the Ticket System Module. Repeats of the same indicators, signatures or events may be handled by the STEM Module because it will be preprogrammed to handle such events without necessarily elevating them to incidents. Alternatively, events that the SIEM Module treated as events can be reprogrammed by the Ticket System Module, an analyst or by any component of the Core Module to be an Incident in the future.

Ticket System Module

The Ticket System Module allows analysts to make annotations to any incident or event with which the analyst interacts. This can include analyst notes that are maintained with other information sent to the Core Module and Log Repository Module. It can also include links that the analyst makes between the current incident or event and previous incidents or events. The Module can assign the incident to a specific threat actor, or reflect any other analysis the analyst conducts on the incident or event. If the incident or event is assigned to a specific threat actor, the Adversary Profile Module can be set to accept this automatically or compare the work and/or outcome of the analyst to the Adversary Profiling Module's own analysis and outcome and accept the assignment if the same or similar outcome results from both sets of analysis, or recommend reconsideration of the analyst's conclusion or rejection of the assignment by the analyst. In any case, both sets of analysis can be recorded in the Log Repository Module for future analysis. If there is a rejection, or a reconsideration recommendation, the system can be programmed to notify the analyst or to take automatic actions of its own.

Malware indicators and malware artifacts can be received by the Core Module. Generally, the output of the Malware Emulation Module is sent to the Indicator Management Module. The output of the Malware Emulation Module can also be received by the Adversary Profile Module so they can be added to the profile of a specific actor if the analysis or specific indicators indicate this is the case. The indicators and artifacts can also be received by the Event Analysis Module so that it can conduct a more comprehensive analysis based on the input from the Malware Emulation Module, input from the STEM Module, input from the Ticket System and historical data analysis conducted on data pulled from the Log Repository Module. The output of this analysis can be the input for the Adversary Profile Module, to determine if the indicators, actions, and/or signatures match those of a known adversary, or those of a suspected adversary. The Event Analysis and Adversary Profile Module both have direct access to the Log Repository Module. This allows both modules to draw in historical events to compare a current event's attributes, which can include indicators, signatures, and/or malware artifacts, to previous events.

Event Analysis Module

The Event Analysis Module can be configured to process the current event, to conduct a rear-view mirror analysis (also called a retrospective analysis) or both. The Event Analysis Module utilizes input from all the modules that provide input to the Core Module, which can include the STEM Module, Sensor Grid, external feeds, Ticket System Module, analyst input, and Malware Emulation Modules. It can also receive input from the Indicator Management Module, Adversary Profile Module, or both. Some or all of these inputs can be combined by the Event Analysis Module to provide an analysis of the event or incident.

If there is information missing or necessary for the Event Analysis Module to conduct the analysis it has been programmed to carry out, it can request that information from external feeds, or any other module it is connected to, to include analyst input from or through the Ticket System Module. From this information, the Analysis Module identifies Indicators of Compromise (IOCs), which can include some or all of the signatures, characteristic information such as type of malware, malware code, structure of the malware and the actions the malware attempted to take or did take, how it took those actions, the types of files, components, networks, ports, systems, etc. the malware attempted to access and/or did access, was resident on or monitored, the source of the malware or source indicator signatures, time of event or incident, number of attempts to access files, implant files, modify files, create files, and/or delete files. IOCs can also include how the malware attempted or successfully implanted itself into code, file(s), a network, network component(s), system hardware, software and any other artifacts, signatures and malware indicators or pertinent information that can be used for future event or incident analysis. IOCs can be used for detection, analysis, or to establish thresholds between events and incidents or to develop countermeasures. Some or all of this information and analysis is recorded in the log repository, as well.

The Event Analysis Module can be configured to execute a rear-view mirror analysis of past events for comparison and determination of trends and identifying possible prior attacks and reducing false positives. The Event Analysis Module, during its analysis or upon completion of its analysis, can pull information from the Log Repository to conduct further historic analysis. The Event Analysis Module can compare the current event or incident and its related data to previous information, such as events, incidents and/or information that was logged that was not identified as either an event or incident. This rear-view mirror analysis can be used to reduce false positives through correlation and algorithms comparing the current indicators, artifacts, signatures and other data to previously logged data.

If the information was previously recorded and determined not to be an event or incident, or was identified by the system as an incident or event and marked by an analyst not to be, the Event Analysis Module can report that the incident was an event or did not qualify as one and prevent notification to the analyst. The Event Analysis Module can also be programmed to identify previous patterns or actions that can upgrade a current logged occurrence or event to an incident. In this case, the analyst would be notified of the incident and the related incidents that the Event Analysis Module has identified. The analyst can then conduct further analysis, downgrade the incident to an event or non-event or non-incident false positive, forward the incident to others, such as code or malware specialists, or supervisors, or take any other action necessary. If the analyst overrides the systems designation, this would be recorded in the log repository. The actions can also be recorded in the Event Analysis Module to be used in future analysis of the same or similar occurrences, events or incidents.

In cases where an event or incident is identified through analysis, by the Event Analysis Module or by an analyst, and no override orders are received by the system, it can automatically provide output to external sources so that they can integrate and utilize the identified indicators, signatures, artifacts and other pertinent information to detect, prevent or address future or current malware or attacks.

Adversary Profile Module

The Adversary Profile Module receives input from some or all of the inputs the Event Analysis Module does. It also receives input from the Event Analysis Module and can provide input to the Event Analysis Module as well. The Adversary Profile Module is designed to take event and/or incident IOCs and compare them with previous incidents. If none of the IOCs match or correlate to previously logged events or input received from external sources, the Adversary Profile Module can tag them as a first heard, original, or non-related occurrence. They can be sent to the Log Repository Module for future comparison or provided as input to the Event Analysis Module in the rear-view mirror analysis to determine if there is a trend from a specific threat actor. If one or more previous IOCs match the current set, the Adversary Profile Module can conduct analysis to determine the similarities between the current and previous occurrences, identified events and/or incidents.

Upon reaching a pre-defined threshold, the current occurrence, event or incident is attributed to the same adversary or threat actor. This may upgrade the current occurrence to an event or incident, or current event to an incident. The previously recorded occurrences, events or incidents that match this can be automatically upgraded or have their designation changed. The Adversary Profile Module can provide this as information to the Event Analysis Module for further analysis of the current occurrence, event or incident. It can also send notification to an analyst of the correlation. The Adversary Profile Module can also provide suggestions or correlations to analysts, or be maintained in the Log Repository Module if the thresholds for other pre-defined or automatic actions are not met. The output of the Adversary Profile Module can also be exported to external feeds or sources.

Log Repository Module

The Log Repository module is a repository for relevant information ingested from external feeds that is recorded by the system. This can include information detected by the Sensor Grid, records of the types of analysis conducted by other modules, and/or the input(s) and the outcome(s) of analysis. The Log Repository module also records information that is ingested from external feeds and sources and can immediately be recorded in the Log Repository. This will allow for later analysis of the ingested information in addition to the data contained in the logs obtained from the Sensor Grid and other system modules. The Module also can record the information that is output from the system, as well as information that is used, modified or changed, and analyst actions.

Indicator Management Module

The Indicator Management Module is designed to calculate an indicator scorecard and manage the expiration of indicators. The Indicator Management Module can take input from all other modules, including the Event Analysis Module and Adversary Profiling Module, input from an analyst, and input from external feeds or sources.

Indicator Scoring and Expiration

In some embodiments, the system can include three levels of indicator expiration: Tier I, Tier II and Tier III. Other numbers of levels could be used. Indicators can be set to either Active or Expired depending on the scorecard for the indicators used. Expired indicators are maintained in the Log Repository Module, while Active indicators are the used by other system Modules to conduct their operations, e.g. the Sensor Grid, SIEM Module and the Ticket System Module.

Indicator scoring can be enabled and disabled as desired, or it can be hidden from the user displays unless specific criteria are met. Indicator scoring applies weights to parameters, whether commercial or individual parameters. The system can also apply the indicator scoring to a subset of indicators for overall approval by a user or administrator as well. The basic formula for the scoring algorithm is PARAMETERS+SCORE+WEIGHT, which provides a customizable multi-dimensional approach. A more in-depth example of IOC score(s) taking into account parameter score(s) is: IOC Score=Source(s)(Score)*Weight+IOC Type*Score*Weight+Event*Weight+Adversary Attribution*Weight+Context(s)*Scores*Weight+Third-Party Score(s)*Weight.

The parameters allow customers to determine how granular and sophisticated they would like scoring to be. Having multiple data points provides a more precise scoring algorithm—too few is broad, whereas too many is overwhelming and ignored. The Score allows customers to prioritize or compare elements of equal tier, such as comparing the possible Sources against each other. A Score of 1 to 10 provides an adequate scorecard. The weight allows customers to rate the parameters to their liking. A weight of 1 to 100 across the parameters provides an adequate scoring. For example, a weight of 0 can be used to disable the parameter from being included. Weight is only applied to the parameter calculations. Weight and Score are similar in nature but weight is only applied to parameters, while a score can be applied to all other components.

The Source of an indicator is a fundamental evaluation of the maliciousness of the information, more specifically, the trustworthiness of the information from the customer being published by the Source. This information can be pulled from the list of enabled Import Feeds/Connectors. In general, the more the sources are tied to an indicator, the higher the probability of risk associated with that indicator. Source also allows for providing blanket scores based upon a Source. IOC Types map back to how a user can leverage indicators for detection or blocking of suspected malicious actions. Indicator types can have different lifecycles based upon their origin, user settings, resources available for detection and other pertinent information.

Event, Occurrence, and Observation parameters represent first-hand visibility of an indicator via an attack. This information should be pulled from the Event Analysis Modules, external sources, the Sandbox Output, the SIEM/Ticket System feedback loop or rear-view mirror lookup through the Log Repository. Indicators association with adversary groups is another mechanism to weight the risk levels of an indicator through Adversary Attribution. The scoring of the various individual adversaries provides users a granular matrixed ability to help score the risk of indicators stemming from a specific adversary.

Figure 10A:
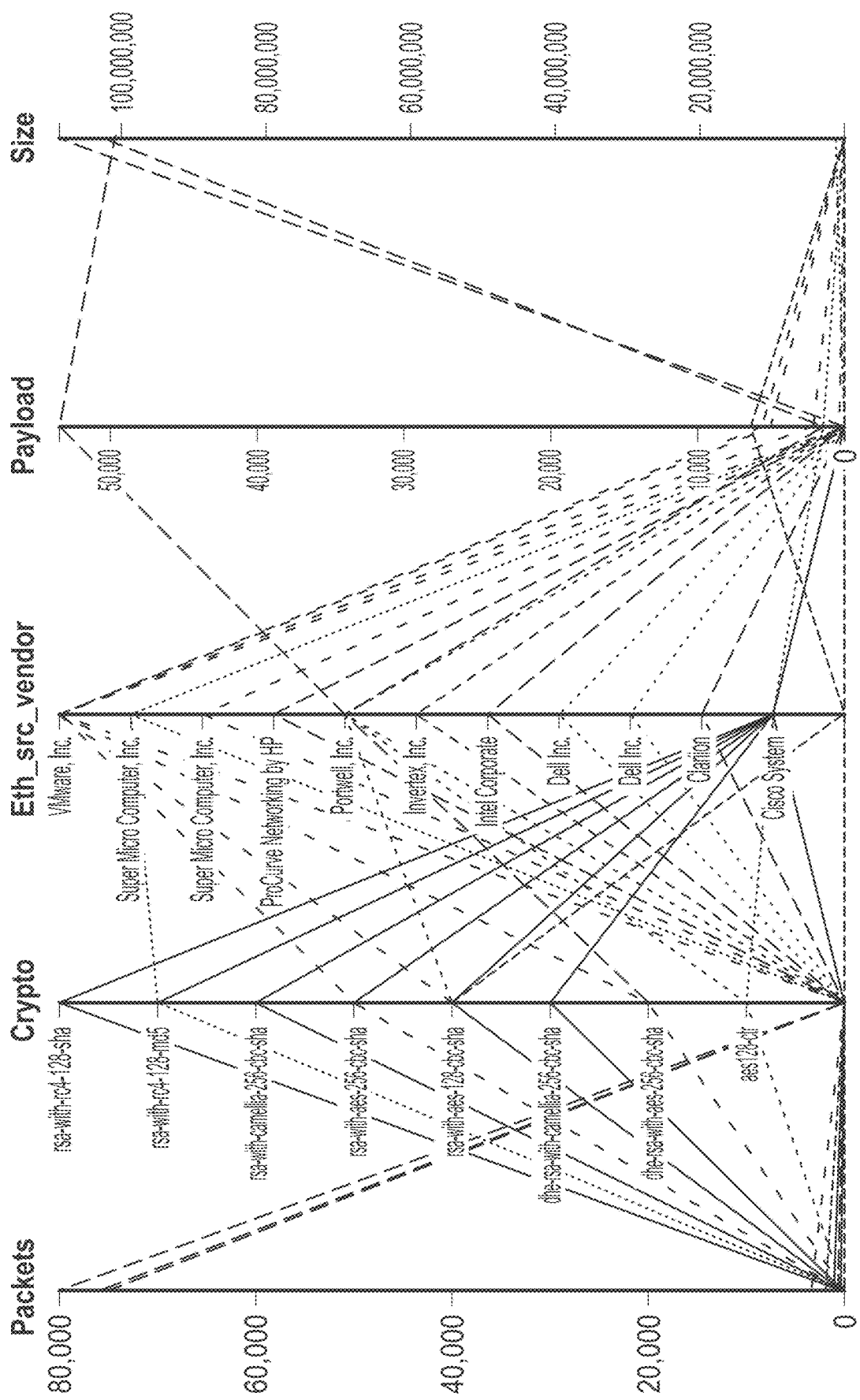
FIGS. 10A and 10B illustrate example attribution timeline graphs.
Figure 10B:
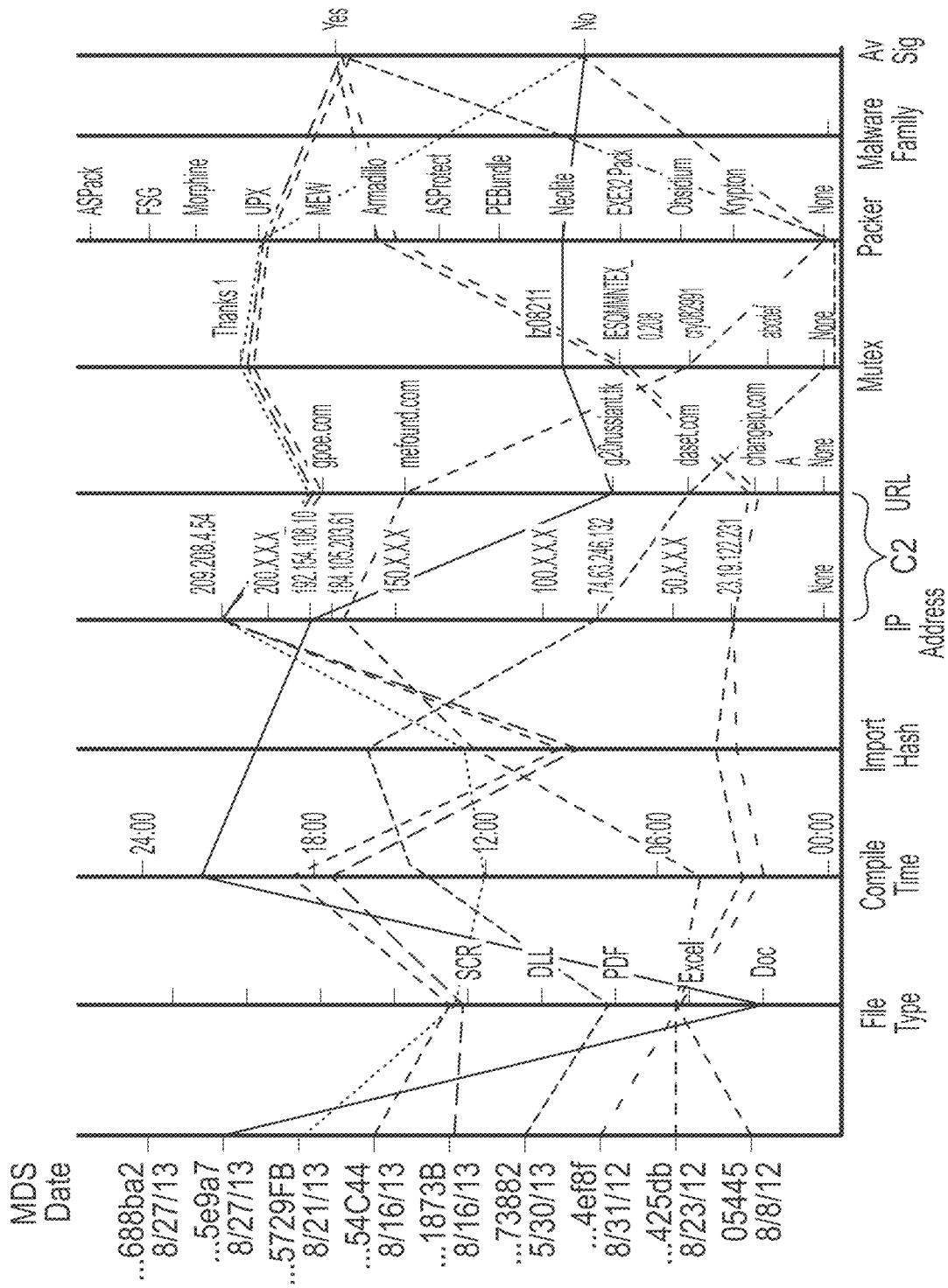

A primary value of scoring an indicator is taking into consideration the additional context being imported. Commercial feed tags related to key-value pair attributes can be taken into consideration. For instance, the Intelligence Provider may provide an attribute of DomainType and possible values that more directly describe the Domain itself—DGA, Sinkholed, ActorControlled, and others. This allows the ability to toggle on/off the attribute values (DomainType, IPAddressType, Status, ThreatType, NetworkIdentifier, and others). An example of scores based upon these is illustrated in FIGS. 10A and 10B.

Furthermore, the context of an indicator is a large part of the score of an indicator because it provides relevant supporting information that helps frame the indicators beyond basic Source, IOC Type, Adversary Attribution and other general factors. The same actions by a specific actor may be malicious in one context, but non-malicious in another. An example would be where a user has authority to modify a database; this would be non-malicious. However, if the same individual, after having the authority revoked, attempts the same actions through the same pathways, it would be malicious and therefore context scores can play a large part in the indicator score determination.

Tier I is the most basic form of expiration. Tier I expiration methodology is based solely on two parameters. These parameters are Source and IOC type. The two parameters are Source and IOC Type and both are mandatory indicator fields which ensures all indicators will be included. Policies that do not include a bulk of the IOCs tend to be counter-intuitive to the approaches currently used. By allowing users the ability to base the expiration on two parameters it provides a weighting combination. Upon the IOC feeds being enabled and IOC Types being identified, e.g., IP address, FQDN, URL, MD5, email sender, etc., the system will calculate an expiration time frame, or date, for the indicator(s). The value represents the number of days an indicator will remain Active before being automatically changed to Expired.

FIG. 2 illustrates example different sources and IOC types and the calculated expiration dates. The dates can be changed based upon assessed threat of a specific indicator or actor. For example, the Adversary Profile module determines this is not an isolated incident but is attributable to a certain recurring type of attack and increases the Active period by a set value or multiplier or an equation based upon weighting the profile of the threat actor.

When multiple sources exist for an IOC type, or multiple IOC types exist for a Source, the system can be set to calculate all of the Expiration dates. Based upon the security level desired, the system can be set to automatically use the shortest, longest, average, median, or most recent score for the Active period. When new sources for the same IOC or threat actor are detected, the system can be set to re-start the expiration clock based upon the newest scorecard, or to use the longer, shorter or average of the scores. For example, an Active period of 36 days was calculated for Source ABC, which has a score of 16, based upon IOC type of IP address, which has a score of 20. 14 days into the Active period, a new Source, QWE for the same IOC type is imported, the expiration date is again 36 days because of the Source and IOC types. The system can be set to add the 36 days to the remaining 22 days, to have an Active time period of 58 days, reset the clock and have 36 days remain Active for both Sources and the IOC type. In another embodiment, if Source or IOC type is desired not to affect the expiration of indicators, the score can be set to zero, either for specific Source(s), IOC type(s) or for all.

As information is ingested, certain sources have higher fidelity or are more trustworthy than others. The information provided by these sources can have higher weights such that when indicator scorecards are calculated from data based upon these sources, the Active period can be longer. Similarly, for sources with lower fidelity, lower weight can be set to calculate a shorter active period based upon the same Source and IOC types. For example, from a high-fidelity source, include a multiplier of 1.5 for all values or a multiplier of 0.5 for less reliable sources or equations that base the fidelity on numerous data points and can be dynamically updated, such as amount of information received, community trust factors, individual person providing the information as opposed to a government entity or a well-known cyber security firm. If, in the previous example, for Source ABC, it is received from a high fidelity feed, the score associated with it could be 20×1.5, such as it is 30, plus 16. It could alternatively be programmed to be 1.5 times the quantity 20+16 such that the total expiration period is 54.

An additional factor that can be added to Tier I scoring by the Indicator Management module is through use of the Adversary Profile module. If the analysis of the Adversary Profile module indicates an adversary threat, any of the above time periods can be increased. Alternatively, specific threats can be designated as never expiring. These can be known threat actors or ones that have developed a high enough Adversary Profile score to warrant a permanent Active indicator status.

Tier II allows for expiration of indicator scoring based upon indicator score/rank and an aging option. The indicator score/rank is designed to be a flexible and robust weighting system that allows control of the weight of overarching parameters, as well as, ranking the values within the parameters from one to ten; one being non-malicious. The overarching score/ranking parameters include Source+context, IOC Type, Occurrence, and Adversary Association. The score/ranking can decay based on system settings, input from internal and external sources and user input for an expiration methodology within the Aging parameter options until it reaches the Expiration Line value. For instance, IOC Type may carry a scoring weight of twenty percent but FQDN may be ranked eight. Therefore, 20% multiplied by 8 is 1.6.

Figure 4:
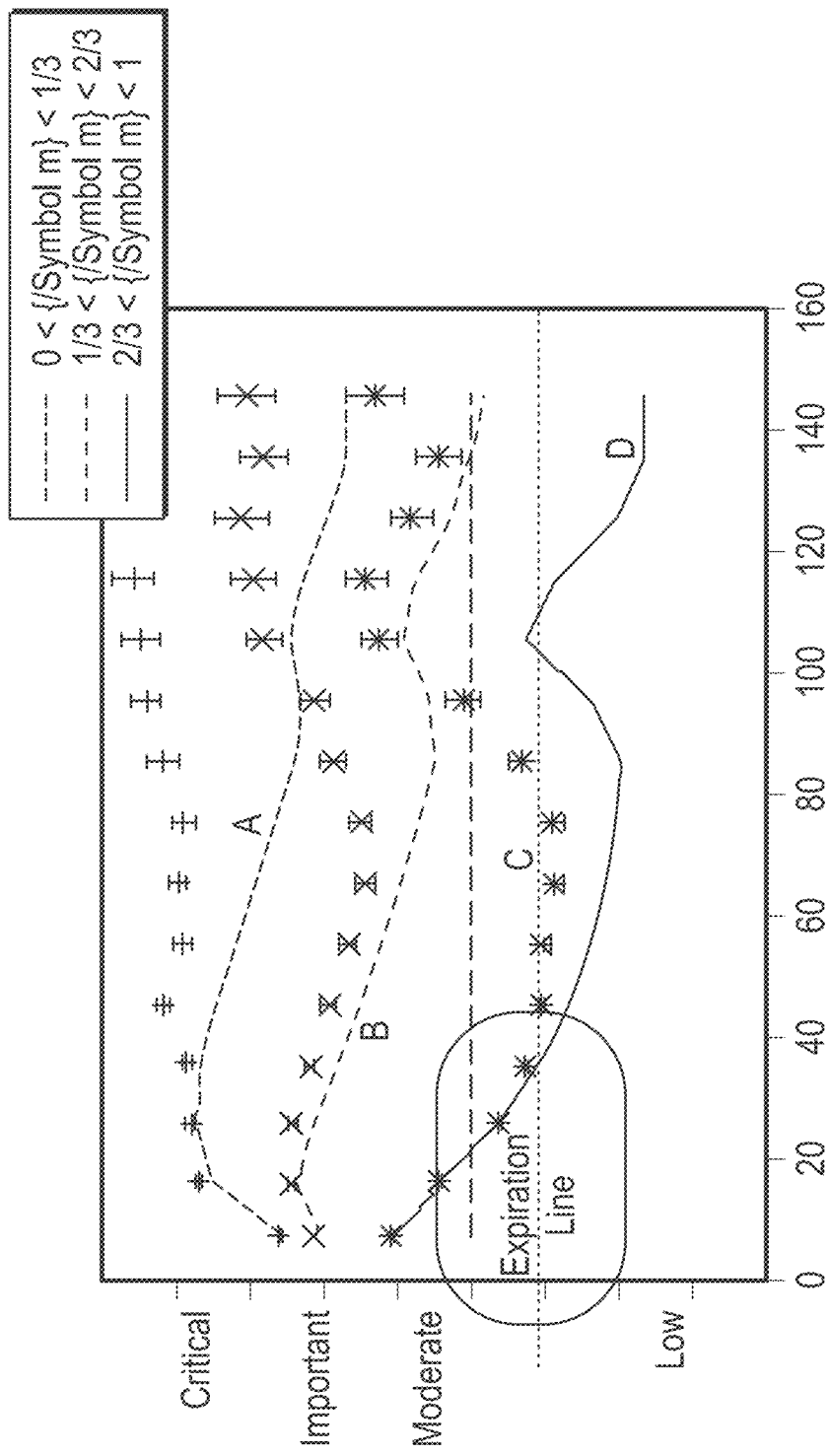
FIG. 4 illustrates an example aging parameter graph.

The IOC Type score is combined with an Aging parameter which determines the rate at which the indicator decays until it expires, going from an Active to Expired status. There are four Aging parameter options. These parameters are illustrated in FIG. 4. The five methods in FIG. 4. are: (A) non-expiring indicator; (B) Linear expiration—deteriorate evenly; (C) Logarithmic expiration—this maintains a longer critical status and then gradually declines before expiring; (D) Exponential expiration—steady decline initially but slows down over time; and (E) Reverse Exponential expiration—provides for a slow initial decay followed by a quick drop off. The Expiration Line can be calculated by the system based upon system settings, input from internal and external sources. Alternatively, it can be user defined or adjusted based on the needs of the user.

The calculation of the values for the graphs can also be used in a table format displaying the overarching parameters to determine the overall scoring weight in FIG. 5A. Examples of the different inputs and weights are illustrated in FIG. 5B-5D. These tables can be displayed by the system to an analyst for selection or modification. The system can also use the values within the tables and the graph to determine specific weights. For instance, under Sources, the system could list all "enabled" Source Feeds to allow the user to rank/score each feed between 1 through 10 (10 being trusted to provide high fidelity malicious IOCs), as well as, indicate the related aging option associated to it. Alternatively, the system can calculate the fidelity scores based upon information and volume, accuracy based upon previous ingests etc. An example of the indicator score/rank by the system: Rank=(Source*Intelligence Provider)+(IOC Type*Email Address)+(Adversary Association*Deep Panda)+(Occurrences*ticketing system)+(Other selected weights)=(20%)(10)+(30%)(10)+(15%)(8)+(10%)

(3)=14.25. This ranking is then used as input to determine the Expiration date of the indicators.

The score that is calculated is labeled $Score_0$ and is then Expired depending on the Expiration methodology chosen. If no expiration methodology is applied, then $Score_t=Score_0$. For other methodologies $Score_0$ is modified by the expiration factor.

Linear expiration: $Score_t=Score_0-(\text{linear function})(t)$, where t represents time.

Logarithmic expiration: $Score_t=Score_0-(\log \text{ rate})(\ln(0))$. This indicator methodology initially decreases quickly but the rate of decly slows over time.

Exponential expiration: $Score_t=Score_0*e^{-(exp\ rate)(t)}$. Indicator declines significantly but the rate of decay slows over time.

Reverse exponential algorithm: indicator will decrement slowly maintaining a longer critical status and then significantly decline before expiring: $Score_t=Score_0-Score_0 e^{-(exp\ rate)(total\ days-t)}$.

FIG. 4 demonstrates graphical examples for each of the above 5 methods, it also includes an expiration threshold line. At the time where an indicator expiration line crosses below the expiration threshold line, it would expire. If it does not cross below it, it does not expire. The Expiration Threshold can be linear or any other shape or function as chosen by the user and their acceptable level of risk and needs.

When an indicator is associated with multiple Source attributes, the calculated average of the "sub-level rankings" can be utilized to increase/decrease the overall value as needed. For instance, ((Source*AVERAGE (Intelligence Provider 1+Intelligence Provider 2+Intelligence Provider 3/30))+(IOC Type* . . . ). Alternatively, the maximum or minimum Source value can be used instead of an average.

In general, when aging multiple parameters, Aging parameter A, Logarithmic expiration, will be used, though the system can be set to use any of the parameters based upon security levels, analyst or use input etc. The system can also use different aging parameters for different events, incidents or threat actors. In these situations, the system can be set to use the greatest, average, lowest, more recent or public or commercial other feed/data Aging parameter.

The third method for calculating Expiration periods for indicators is Tier III indicator scoring. This method, instead of using a two-dimensional graph information and that contained in tables, and uses a multidimensional matrix for calculation of Expiration periods. The parameters would include additional information to be included in the calculation of rank/score and Aging parameter(s) selected. With this method, multiple data points regarding a single Source or IOC type can be combined to determine factors for calculation of the expiration date. This can include context scores for each of the Sources, parameters, indicators, artifacts detected and other IOC information to provide situation specific scoring that is a more accurate match to industry experience. Additionally, each time an event is detected that includes the indicator, the indicator risk score can be increased, be it by a percentage, a function based upon the kind of detection and event. The risk score can be increased based upon how long ago the indicator was last detected if it was based on a different attack vector and other pertinent information.

Attacker Tracking

The Adversary Profile module uses data points in order to develop an Adversary Profile in addition to using retrospective attribution of prior incidents to the current event. This can also be used to develop an Adversary score for use as input to the Event Analysis and Indicator Management Modules. The equation for Adversary Score can be calculated as the IOC Score equation, however these are based only on parameters, scores and weights associated with the specific adversary as opposed to an IOC type. The Adversary Score can be dependent on the type of attacks, who or what is targeted, frequency of attacks, success rate of attacks, if the attacks or access or indicators were not discovered until a rear-view mirror analysis and how long they went unnoticed. They can also include attack vectors, damage inflicted, amount or type of data ex-filtrated, sophistication of attacks, apparent funding level of the adversary or other pertinent attributes that can be used for profiling the threat actor. These are combined to develop an adversary score to help with Adversary Profile. The output of the Adversary Profile module can also be used by the Indicator Management and Event Analysis modules to extend or shorten indicator Active times or help narrow parameters for a rear-view mirror search. It can also be used to increase fidelity of analysis and reducing false positives through correlation of prior Adversary scores compared to the current Adversary score when the system determines whether to attribute a specific occurrence, event or incident to a specific threat actor.

Adversary scoring can also use a Score, a Rank or Yes/No criterion. The Yes/No assessment is a high-level assessment allowing an organization to include attack characteristics without needing to know the specifics or when including percentage values. This can be very useful when developing new adversary profiles.

Using a Rank allows an organization to compare similar elements while Score allows an organization to apply a weighted system by using the methodologies described previously.

FIG. 7 shows three different Parameter tables with associate weights. It is illustrated by labeling them as Phase I, which only uses five fundamental parameters. Phase II and Phase III charts have additional parameters which may be used as more parameters are identified with specific threat actors. Alternatively, a Phase III chart could be used initially with the unknown parameters being disabled through the use of a weight of zero percent.

Each of the score card parameters can be broken down such as Adversary Category. This can be broken down into various types such as Foreign intelligence actors, Crimeware, Hacktivists, Professional Hackers, or others, and assigning a score to each. This can be done for each of the parameters and is illustrated by various examples in FIGS. 8A-8F. A similar table can exist for each parameter with scores assigned to each.

FIG. 9 illustrates a scorecard table that may be color coded based upon parameters and the total score of each adversary or threat actor. It allows a user to visually compare the scores of each adversary. The table can also be sorted such as to only display adversaries with specific parameters scores equal to, above or below on chosen by the user. Similarly, it can be sorted to hide or display only adversaries with total scores that are above, below or equal to a defined score.

Another method, in addition to Adversary scoring, for adversary attribution is by plotting various adversary MD5 samples over a duration of time patterns can be extracted to highlight outliers. This allows attribution of situations to specific threat actors because of the wider range of data sets that are used.

An aspect of attribution is determining the level of sophistication and how well funded the adversary is, this can be based on information to include frequency of a new MD5 delivery or re-use of infrastructure. Adversaries that change command and control (C2) infrastructure, exploits, compile-time, host/carrier file types, such as .doc, .pdf, .xls, .scr, etc., within a short period of time may be categorized as well-funded. From the perspective of an adversary, maintaining adversary infrastructure across all targeting takes a significant amount of time and organization—adversaries that constantly re-use C2 infrastructure are less likely to be highly targeting an individual because there is a higher probability their infrastructure will be blacklisted.

With reference to FIG. 10A, another benefit of "timelining" the adversary attacks (x-axis) is the ability to see temporal patterns and the velocity of attacks. More attacks within a short period of time may suggest an event triggered attack (i.e. new contract/product/merger announcement). This approach to timeline based on the x-axis is a pivot to traditional timeline analysis (y-axis) but the combination of temporal data+y-axis datapoints could reveal very interesting information. FIG. 8B is a further illustration of timelining adversary datapoints for attribution to specific threat actors based upon ingested data points and data gathered by the system. Based upon points that are present, or absent, or relation of points and other context information, the Adversary Attribution module can associate occurrence, events and incidents to a threat actor or associate indicators or signatures previously detected to threat actors to profile adversaries.

Alternatively, FIG. 10A or 10B illustrate a graph that can have recipients on the y-axis, e.g. those being targeted, be it a department, individuals, groups, systems with specific characteristics or other shared trait. This would allow for extracting patterns of what an adversary is attacking or looking for and can be used to protect the proper assets through calibration of the system to detect threats through the Sensor Grid.

The system can provide several outputs to users. One is to provide suggestions for improvements of defensive posture and protection of assets. This can include suggestion of specific programs or hardware modules to install or how to reconfigure networks. The system can be programmed to automatically implement any suggestions it makes that it can. Other outputs can event or incident notifications to an analyst or to include the graphs and data charts such as those exemplified by the FIG. 2-10. These can be used by analysts or other users or exported to external sources for analysis, use or viewing by others. The system can also provide alerts on dashboard to analysts when a new occurrence, event or incident is detected that may require the attention of a user or specific actions that are not preprogrammed into the system.

Offensive/Penetration Testing Usage

The system and method scan also be used in "offensive" means such as for penetration and security testing. The system can be used by Certified Ethical Hackers, system administrators and others to manage capabilities in an offensive manner to test system vulnerabilities. In an offensive setting, testers would monitor indicators that are associated with attacks and attempt to use methods, venues, software, hardware, attack vectors that are not recorded or with minimal scores to avoid triggering a system. By this same method, penetration testers can use known methodologies with specific scores in new ways to if the system would react as expected and protect itself or allow these to pass.

While in defensive operations, the system identifies patterns of attacks, offensive use would be to identify these patterns and set up methods that do not follow the previous patterns or mimic non-malicious patterns to attempt to bypass the systems security measures. Penetration testers can also use Events to help organize different, simultaneous exercises to properly manage internal resources for security testing and normal operations.

Penetration testers can upload malware into the archive, similar to how defenders upload malware samples to create a malware zoo. Archiving the malware allows penetration testers to test follow-up exercises to ensure defenses were implemented. It also ensures that if a penetration tester leaves an organization, it would be captured for the person who backfills them.

Set Visualizations

Figure 11:
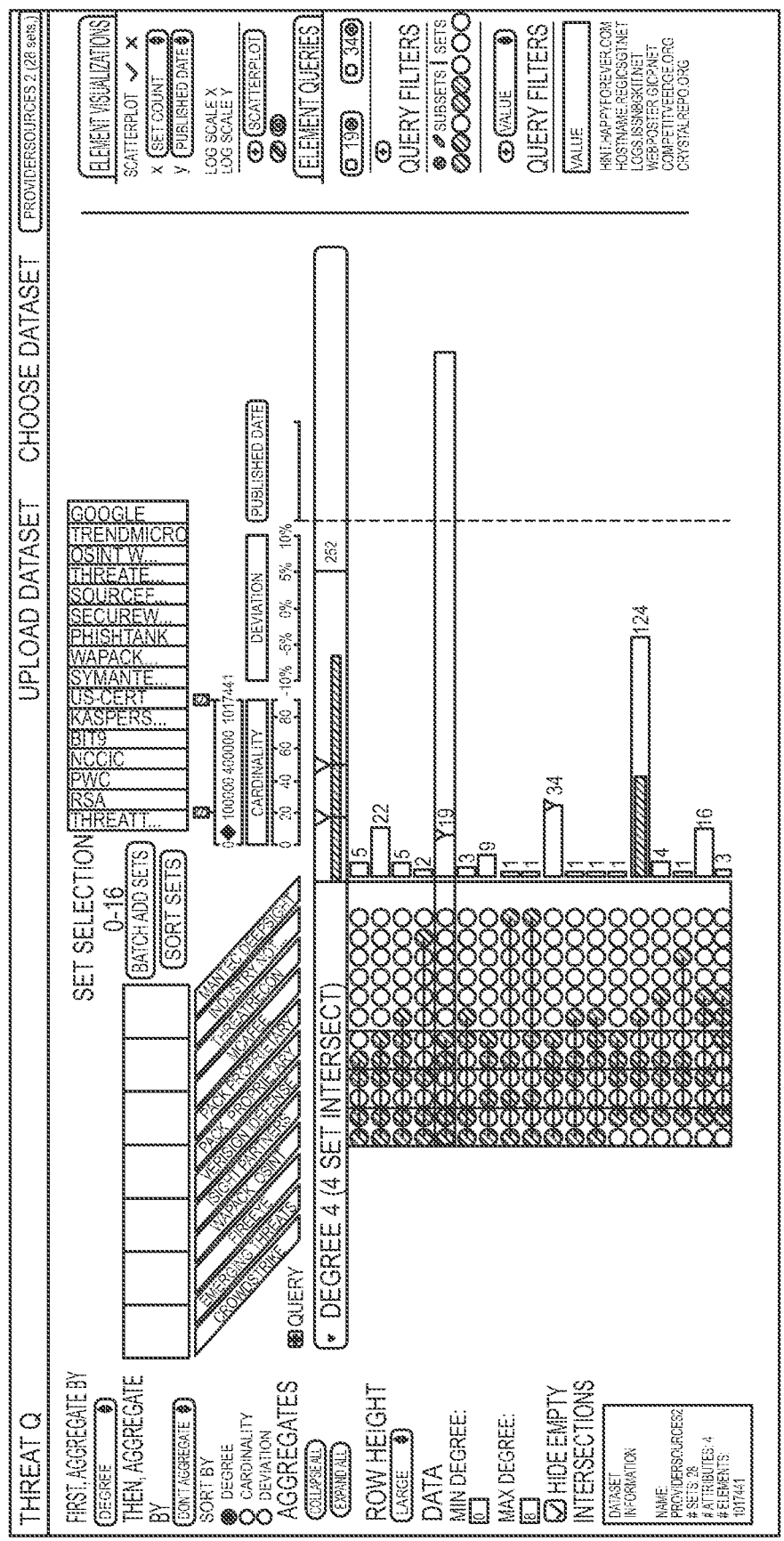
FIG. 11 illustrates an example set visualization interface.

The systems and methods described herein can also be used to display threat feed data according to set visualizations. FIG. 11 illustrates an example set visualization interface. One embodiment for a method for collecting and distributing cybersecurity threat intelligence information comprises collecting threat intelligence information from a plurality of threat intelligence information sources, the collected threat intelligence information being of different formats; parsing the collected threat intelligence information into a common format; storing the parsed threat intelligence information in a database, wherein the parsed threat intelligence information further comprises multiple threat indicators; storing the threat indicators in the database in association with one or more parameter attributes, wherein a first parameter attribute is a source of the threat indicator; receiving the parsed threat intelligence information comprising threat indicators from the database; exporting the formatted threat intelligence information, wherein the threat intelligence information includes indicators, sources, and dates for input to a set visualization process; calculating a set visualization of the threat intelligence information, wherein the set visualization is configured to calculate and display one or more of: a trend analysis, analysis based on date constraints, side-by-side comparison, or time series analysis.

Further embodiments comprise exporting a first subset of the formatted threat intelligence information, wherein the first subset of threat intelligence information includes indicators, sources, and dates for input to the set visualization process; exporting a second subset of the formatted threat intelligence information, wherein the second subset of threat intelligence information includes indicators, sources, and dates for input to the set visualization process; determining a degree of overlap between the first and second subsets.

Further embodiments comprise comparing the first and second subsets to identify common indicators of compromise; and conforming a common name to common indicators of compromise.

Further embodiments comprise calculating a graphical side-by-side comparison by comparing the formatted threat intelligence information to an enterprise internal malware sandbox, ticketing system for intrusion or infections, and known successful attack blocks; identifying overlap of indicators in the side-by-side comparison; and executing a query for additional indicators of compromise based on the overlap.

Further embodiments comprise calculating a temporal analysis by applying a time-series analysis to determine the sequence of threat intelligence information acquisition, wherein the timeseries analysis is presented as a scatterplot or boxplot such that each dataset is represented by a separate identifier color.

Further embodiments comprise identifying threat intelligence information and extracting indicators of compromise from that threat intelligence information; storing sensor grid logs from a sensor; comparing the extracted indicators of compromise to the stored sensor grid logs; and performing a timeseries analysis to determine if the sensor detected the indicators of compromise before or after the intelligence feed.

In further embodiments, the set visualization further comprises a visualization of set intersections in a matrix layout that introduces aggregates based on groupings and queries, enabling the representation of associated data, including as the number of elements in the aggregates and intersections.

Investigations Platform

The systems and methods described herein can also be used to investigate an active threat. Historically, security team analysts and incident responders are geographically distributed around the world, which makes team collaboration during an investigation very difficult or impossible, as they are unable to know who is doing what, if efforts are being duplicated, and project status. The inventive investigations platform described herein enables simultaneous multiple user collaboration, including: link analysis which display relationships across objects, timeline and timeseries analysis which displays sequential actions taken by the incident response team and/or attackers, and project management such as task delegation.

Through the investigations platform, queries can be executed against internal and external resources, such as a ticketing system, or malware detection tool. The investigations platform can be configured to display data in layers, which allows for an isolated or granular view of the data.

Figure 12:
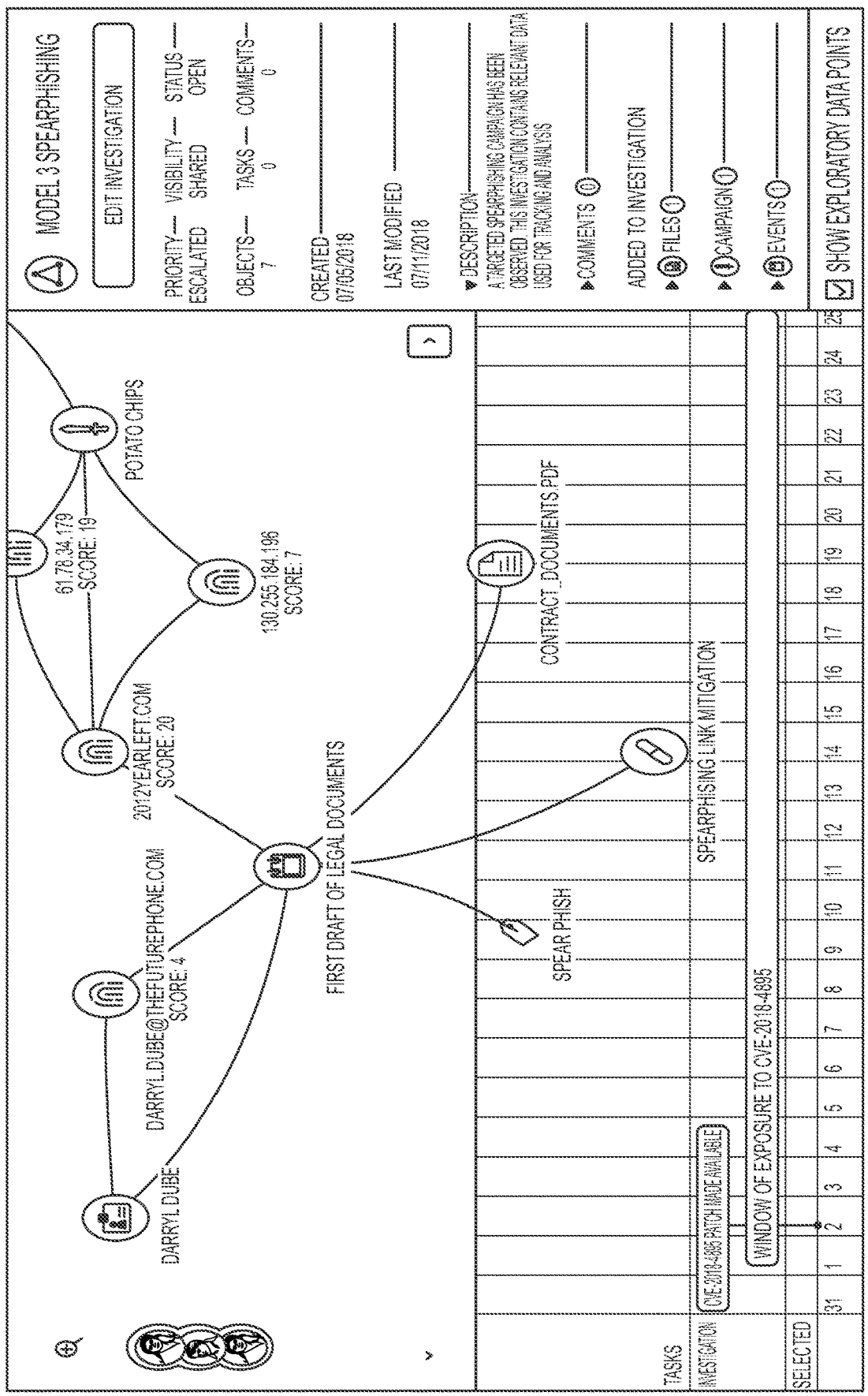
FIG. 12 illustrates an example interface for threat investigations.
Figure 13:
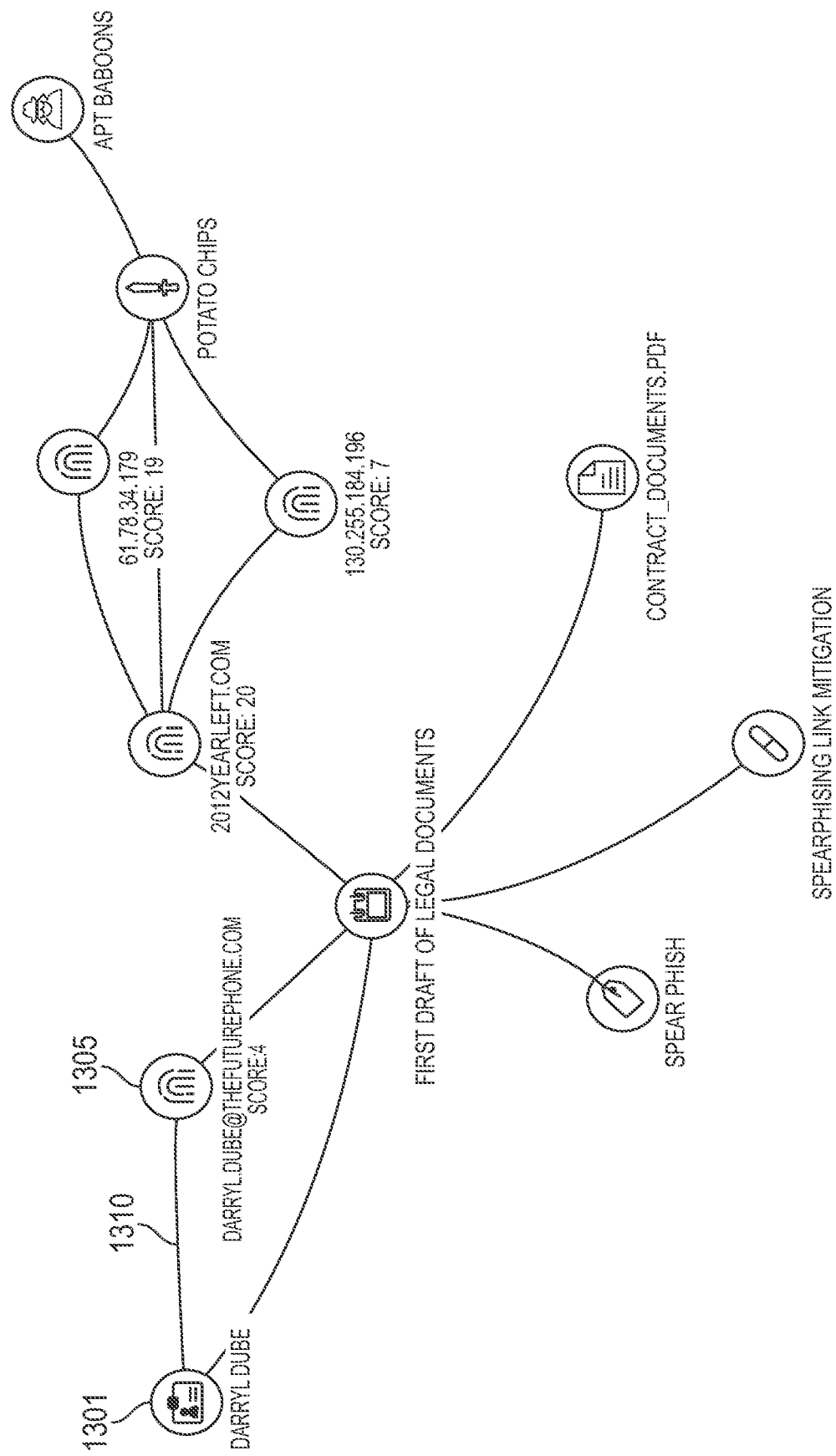
FIG. 13 illustrates an example visualization of threat connections in threat investigations.

FIG. 12 illustrates an example interface for threat investigations, showing threat data containers and common relations between threat data container objects, as well as a timeline of events corresponding to the threat data container objects. FIG. 13 illustrates an example visualization of common relations as connections between threat data container objects in threat investigations. In the illustrated example, threat data container object 1301 is indicated as having a common relation 1310 with threat data container object 1305.

Figure 15:
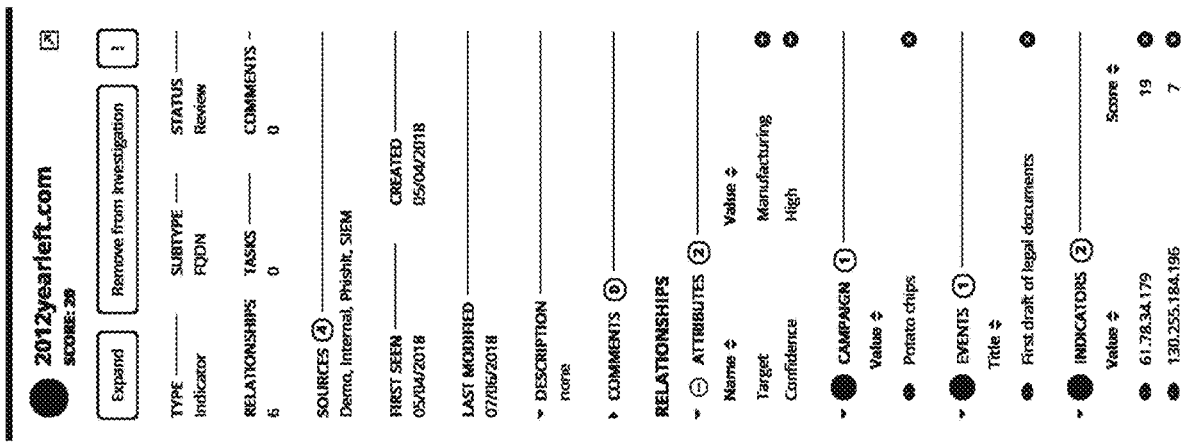
FIG. 15 illustrates an example detail panel for an indicator data container object in a threat investigation.
Figure 16:
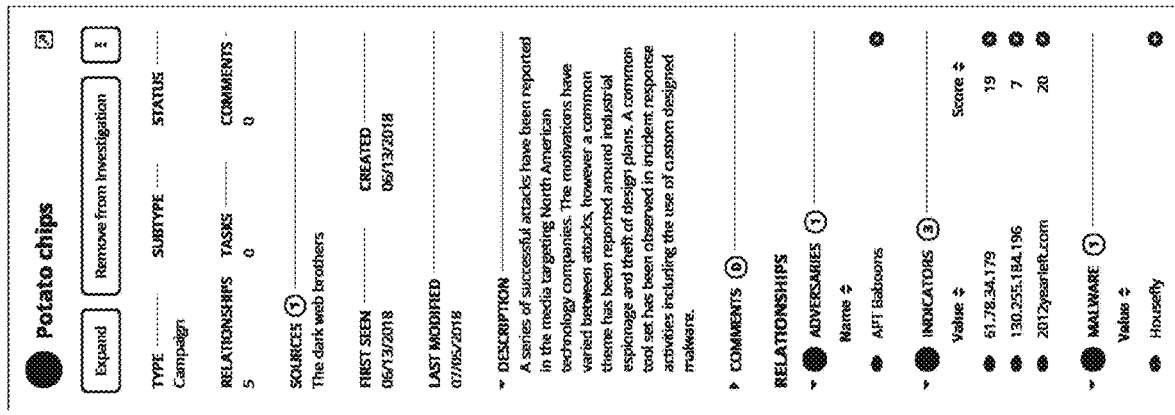
FIG. 16 illustrates an example detail panel for a campaign data container object in a threat investigation.
Figure 17:
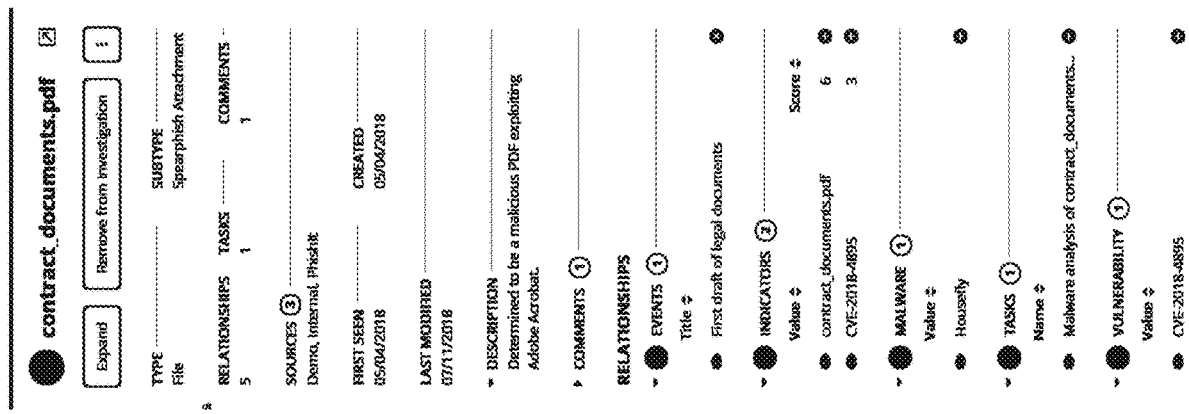
FIG. 17 illustrates an example detail panel for a file data container object in a threat investigation.
Figure 18:
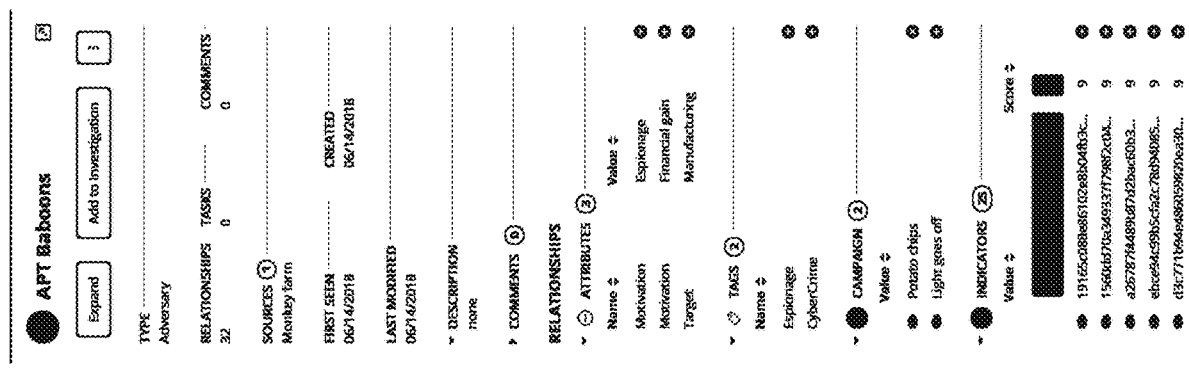
FIG. 18 illustrates an example detail panel for an adversary data container object in a threat investigation.
Figure 19:
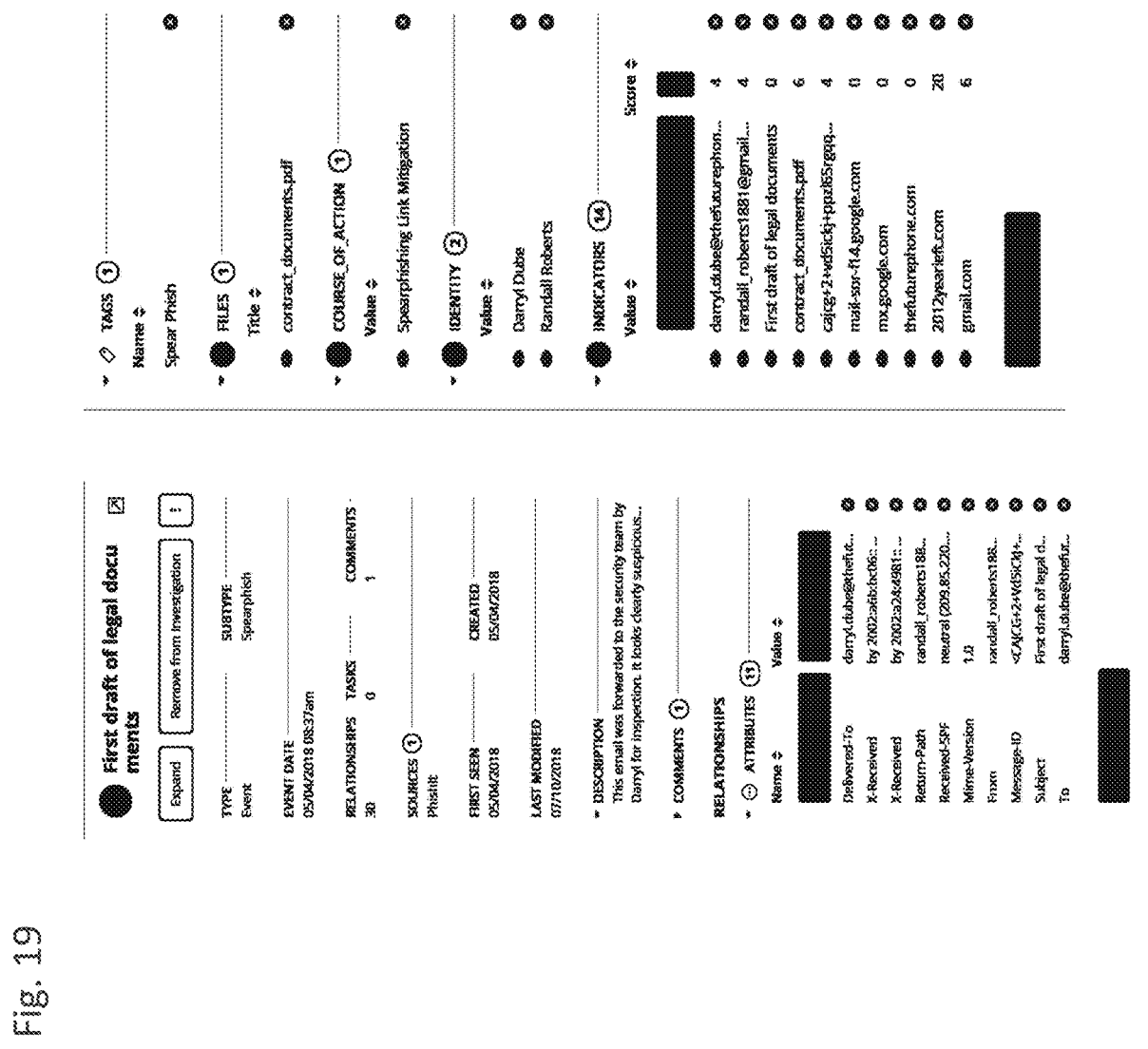

FIG. 14 illustrates an example detail panel for an identity data container object in a threat investigation. In the illustrated example, the identity data container object is linked to other event and indicator data container objects. FIG. 15 illustrates an example detail panel for an indicator data container object in a threat investigation. In the illustrated example, the indicator data container is linked to other campaign, event, and indicator data container objects. FIG. 16 illustrates an example detail panel for a campaign data container object threat data container object in a threat investigation. In the illustrated example, the campaign data container object is linked to other adversary, indicator, and malware data container objects. FIG. 17 illustrates an example detail panel for a file data container object in a threat investigation. In the illustrated example, the file data container object is linked to other event, indicator, malware, task, and vulnerability data container objects. FIG. 18 illustrates an example detail panel for an adversary data container object in a threat investigation. In the illustrated example, the adversary data container object is linked to other task, campaign, and indicator data container objects. FIG. 19 illustrates an example detail panel for an event data container object in a threat investigation. In the illustrated example, the event data container object is linked to other files, course of action, identity, and indicator data container objects.

Any of the data container objects can also include fields for attributes, tags, and times. The times associated with data container objects can be displayed simultaneously with the linked network of data container objects, as illustrated in FIG. 12.

One embodiment of a method for collecting, processing, and displaying cybersecurity threat intelligence information comprises: collecting threat intelligence information from a plurality of threat intelligence information sources, the collected threat intelligence information being of different formats; parsing the collected threat intelligence information into a common format; storing the parsed threat intelligence information in a database, wherein the parsed threat intelligence information further comprises multiple threat indicators; storing the threat indicators in the database in association with one or more parameter attributes, wherein a first parameter attribute is a source of the threat indicator; receiving the parsed threat intelligence information comprising threat indicators from the database; storing the parsed threat intelligence information in a first threat data container object; receiving investigation information relating to an active threat investigation, wherein the investigation information is one or more of: an event type, attack vector, indicator of compromise, adversary attribution, or file, and wherein the investigation information is associated with a threat indicator; storing the investigation information in a second threat data container object; identifying a common relation between the first threat data container object and the second threat data container object based on the respective threat indicators of the first threat data container object and the second threat data container object; and displaying a graphical indication of the common relation between the first threat data container object and the second threat data container object.

Further embodiments comprise identifying multiple common relations between multiple threat data container objects; assigning multiple subsets of common relations to multiple respective layers; and selecting one of the multiple layers for display to a user such that the non-selected layers are not displayed.

In further embodiments, at least one layer is associated with a level of access or an individual user.

Further embodiments comprise recording in association with a threat data container object an indication that a user has taken an action with respect to the threat data container object; recording in association with the threat data container object a time associated with the action taken with respect to the threat data container object; and displaying the threat data container object, a representation of the action taken, and the time associated with the action taken on the threat data container object.

In further embodiments, the adversary attribution indicates one or more of a foreign intelligence actor, crimeware, hacktivist, or professional hacker.

In further embodiments, threat intelligence information in the first threat data container object is a file hash, and the second threat data container contains at least one file hash, and further comprising comparing the file hashes in the first threat data container object and the second threat data container object to detect equality, and if the file hashes are equal, then identifying a common relation between the first threat data container object and the second threat data container object.

Further embodiments comprise identifying a file corresponding to the file hashes detected to be equal, and transmitting that file to an external integration for threat analysis.

In some embodiments, the set visualization and threat management platforms can be combined. Embodiments of the combined method for collecting and distributing cybersecurity threat intelligence information comprise collecting threat intelligence information from a plurality of threat intelligence information sources, the collected threat intelligence information being of different formats; parsing the collected threat intelligence information into a common format; storing the parsed threat intelligence information in a database, wherein the parsed threat intelligence information further comprises multiple threat indicators; storing the threat indicators in the database in association with one or more parameter attributes, wherein a first parameter attribute is a source of the threat indicator; receiving the parsed threat intelligence information comprising threat indicators from the database; storing the parsed threat intelligence information in a first threat data container object; receiving investigation information relating to an active threat investigation, wherein the investigation information is one or more of: an event type, attack vector, indicator of compromise, adversary attribution, or file, and wherein the investigation information is associated with a threat indicator; storing the investigation information in a second threat data container object; identifying a common relation between the first threat data container object and the second threat data container object based on the respective threat indicators of the first threat data container object and the second threat data container object; displaying a graphical indication of the common relation between the first threat data container object and the second threat data container object; exporting the formatted threat intelligence information, wherein the threat intelligence information includes indicators, sources, and dates for input to a set visualization process; and calculating a set visualization of the threat intelligence information, wherein the set visualization is configured to calculate and display one or more of: a trend analysis, analysis based on date constraints, side-by-side comparison, or time series analysis.

System Architecture

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions. Example computerized systems for implementing the invention is illustrated in FIG. 1. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on an appropriate computer system running an appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™ etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the registers of a computing system and/or memories into other data similarly represented as physical quantities within the memories of a computing system, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A method for collecting, processing, and displaying cybersecurity threat intelligence information, comprising:
    collecting threat intelligence information from a plurality of threat intelligence information sources, the collected threat intelligence information being of different formats;
    parsing the collected threat intelligence information into a common format;
    storing the parsed threat intelligence information in a database, wherein the parsed threat intelligence information further comprises multiple threat indicators;
    storing the threat indicators in the database in association with one or more parameter attributes, wherein a first parameter attribute is a source of a threat indicator;
    receiving the parsed threat intelligence information comprising threat indicators from the database;
    storing the parsed threat intelligence information in a first threat data container object;
    receiving investigation information relating to an active threat investigation, wherein the investigation information is one or more of: an event type, attack vector, indicator of compromise, adversary attribution, or file, and wherein the investigation information is associated with a threat indicator;
    storing the investigation information in a second threat data container object;
    identifying a common relation between the first threat data container object and the second threat data container object based on the respective threat indicators of the first threat data container object and the second threat data container object;
    displaying the first threat data container object, the second threat data container object and a graphical indication of the common relation between the first threat data container object and the second threat data container object;
    exporting formatted threat intelligence information, wherein the formatted threat intelligence information includes indicators, sources, and dates for input to a set visualization process; and
    calculating a set visualization of the threat intelligence information, wherein the set visualization is configured to calculate and display one or more of: a trend analysis, analysis based on date constraints, side-by-side comparison, or time series analysis.

2. The method of claim 1, further comprising:
    identifying multiple common relations between multiple threat data container objects;
    assigning multiple subsets of common relations to multiple respective layers; and
    selecting one of the multiple layers for display to a user such that the non-selected layers are not displayed.

3. The method of claim 2, wherein at least one layer is associated with a level of access or an individual user.

4. The method of claim 1, further comprising:
    recording in association with a threat data container object an indication that a user has taken an action with respect to the threat data container object;

recording in association with the threat data container object a time associated with the action taken with respect to the threat data container object; and displaying the threat data container object, a representation of the action taken, and the time associated with the action taken on the threat data container object.

5. The method of claim 1, wherein the adversary attribution indicates one or more of a foreign intelligence actor, crimeware, hacktivist, or professional hacker.

6. The method of claim 1, wherein threat intelligence information in the first threat data container object is a file hash, and the second threat data container contains at least one file hash, and further comprising:

comparing the file hashes in the first threat data container object and the second threat data container object to detect equality; and if the file hashes are equal, then identifying a common relation between the first threat data container object and the second threat data container object, then identifying a file corresponding to the file hashes detected to be equal and transmitting that file to an external integration for threat analysis.

7. A method for collecting, processing, and displaying cybersecurity threat intelligence information, comprising:

collecting threat intelligence information from a plurality of threat intelligence information sources, the collected threat intelligence information being of different formats;

parsing the collected threat intelligence information into a common format;

storing the parsed threat intelligence information in a database, wherein the parsed threat intelligence information further comprises multiple threat indicators;

storing the threat indicators in the database in association with one or more parameter attributes, wherein a first parameter attribute is a source of a threat indicator;

receiving the parsed threat intelligence information comprising threat indicators from the database;

storing the parsed threat intelligence information in a first threat data container object;

receiving investigation information relating to an active threat investigation, wherein the investigation information is one or more of: an event type, attack vector, indicator of compromise, adversary attribution, or file, and wherein the investigation information is associated with a threat indicator;

storing the investigation information in a second threat data container object;

identifying a common relation between the first threat data container object and the second threat data container object based on the respective threat indicators of the first threat data container object and the second threat data container object; and displaying the first threat data container object, the second threat data container object and a graphical indication of the common relation between the first threat data container object and the second threat data container object.

8. The method of claim 7, further comprising:

identifying multiple common relations between multiple threat data container objects;

assigning multiple subsets of common relations to multiple respective layers; and selecting one of the multiple layers for display to a user such that the non-selected layers are not displayed.

9. The method of claim 8, wherein at least one layer is associated with a level of access or an individual user.

10. The method of claim 7, further comprising:

recording in association with a threat data container object an indication that a user has taken an action with respect to the threat data container object;

recording in association with the threat data container object a time associated with the action taken with respect to the threat data container object; and displaying the threat data container object, a representation of the action taken, and the time associated with the action taken on the threat data container object.

11. The method of claim 7, wherein the adversary attribution indicates one or more of a foreign intelligence actor, crimeware, hacktivist, or professional hacker.

12. The method of claim 7, wherein threat intelligence information in the first threat data container object is a file hash, and the second threat data container contains at least one file hash, and further comprising comparing the file hashes in the first threat data container object and the second threat data container object to detect equality, and if the file hashes are equal, then identifying a common relation between the first threat data container object and the second threat data container object.

13. The method of claim 12, further comprising identifying a file corresponding to the file hashes detected to be equal, and transmitting that file to an external integration for threat analysis.

* * * * *